(12) United States Patent
Cioli et al.

(10) Patent No.: US 7,680,876 B1
(45) Date of Patent: Mar. 16, 2010

(54) HIGHLY AVAILABLE DOMAIN NAME SYSTEM

(75) Inventors: Jeffrey Cioli, Derry, NH (US); Joshua B. Littlefield, Wellesley, MA (US)

(73) Assignee: Cisco Technology, Inc., San Jose, CA (US)

( * ) Notice: Subject to any disclaimer, the term of this patent is extended or adjusted under 35 U.S.C. 154(b) by 447 days.

(21) Appl. No.: 11/638,742

(22) Filed: Dec. 14, 2006

(51) Int. Cl.
*G06F 15/16* (2006.01)
*G06F 11/00* (2006.01)
*G06F 7/00* (2006.01)
*G06F 17/30* (2006.01)

(52) U.S. Cl. .................. 709/201; 709/245; 707/10; 707/201; 714/4

(58) Field of Classification Search .................. None
See application file for complete search history.

(56) References Cited

U.S. PATENT DOCUMENTS

| 6,317,754 | B1 * | 11/2001 | Peng .......................... 707/203 |
| 6,381,627 | B1 * | 4/2002 | Kwan et al. ................. 709/201 |
| 6,446,090 | B1 * | 9/2002 | Hart ........................... 707/201 |
| 2003/0014480 | A1 * | 1/2003 | Pullara et al. ............... 709/203 |
| 2003/0126133 | A1 * | 7/2003 | Dattatri et al. .............. 707/10 |
| 2004/0210672 | A1 * | 10/2004 | Pulleyn et al. ............. 709/245 |
| 2006/0143711 | A1 | 6/2006 | Huang et al. ................ 726/23 |
| 2006/0227367 | A1 * | 10/2006 | Kitada ....................... 358/1.15 |

OTHER PUBLICATIONS

"DNS zone transfer," retrieved from Internet (http://en.wikipedia.org/wiki/IXFR) Nov. 27, 2006, 4 pages.

Mockapetris, P., "RFC1034—Domain Names—concepts and facilities," retrieved from Internet (http://www.faqs.org/rfcs/rfc1034.html) Nov. 27, 2006, ISI, Nov. 1987, 39 pages.

Mockapetris, P., "RFC 1035—Domain Names—implementation and specification," retrieved from Internet (http://www.faqs.org/rfcs/rfc1035.html) Jul. 27, 2007, ISI, Nov. 1987, 39 pages.

Thomson, S., et al., "RFC 2136—Dynamic Updates in the Domain Name System (DNS Update)," retrieved from Internet (http://www.faqs.org/rfcs/rfc2136.html) Jul. 27, 2007, ISC, Apr. 1997, 18 pages.

U.S. Appl. No. 11/585,560, filed Oct. 24, 2006, by Bernard Volz, entitled "Communicating Additional Information in a DNS Update Response by Requesting Deletion of a Specific Record".

* cited by examiner

*Primary Examiner*—Wen-Tai Lin
(74) *Attorney, Agent, or Firm*—BainwoodHuang

(57) ABSTRACT

A technique is performed by a high availability main primary DNS name server. The technique involves receiving a DNS update sent from a DNS client to the main primary DNS name server and directly modifying a main DNS record based on the DNS update. The technique further involves directing a backup primary DNS name server to modify a backup DNS record based on the DNS update while both the main primary DNS name server and the backup primary DNS name server (i) are configured to distribute DNS information to secondary DNS name servers and DNS clients and (ii) are in ongoing communication with each other, the backup primary DNS name server being configured to receive DNS updates sent from the DNS clients to the backup primary DNS name server and modify backup DNS records based on the DNS updates in response to a loss of communication between the main primary DNS name server and the backup primary DNS name server.

18 Claims, 5 Drawing Sheets

HIGHLY AVAILABLE DOMAIN NAME SYSTEM

TECHNICAL FIELD

The present disclosure relates generally to data communications. More particularly, the present disclosure relates to the Domain Name System (DNS).

BACKGROUND

In general, the DNS enables translation of domain names to Internet Protocol (IP) addresses. Such translation makes it possible to attach easy-to-remember domain names (e.g., "domainname.org") to difficult-to-remember IP addresses (e.g., "200.140.130.120"). A detailed description of conventional DNS is provided in documents entitled "RFC 1034—DOMAIN NAMES—CONCEPTS AND FACILITIES" and "RFC 1035—DOMAIN NAMES—IMPLEMENTATION AND SPECIFICATION," both by P. Mockapetris, November 1987, the teachings of which are hereby incorporated by reference in their entirety.

Some hosts have dynamically provided IP addresses provided by Dynamic Host Configuration Protocol (DHCP) servers. A host having a dynamically provided IP address may also have a domain name. However, since dynamically assigned IP addresses are generally only valid for finite amounts of time, the IP address associated with a particular domain name may change from time to time. In order to keep DNS current in a DHCP environment, DHCP hosts typically register and dynamically update their resource records (RRs) with authoritative DNS name servers whenever their IP address changes. Such operation reduces the manual administration burden of zone records, i.e., master files which are managed by the authoritative DNS name servers. A detailed description of the conventional DNS update process is provided in a document entitled "RFC 2136-DYNAMIC UPDATES IN THE DOMAIN NAME SYSTEM (DNS UPDATE)", by P. Vixie et al., April 1997, the teachings of which are hereby incorporated by reference in their entirety.

Primary authoritative DNS name servers may accept changes to the DNS tables and respond to DNS resolution requests, while secondary authoritative DNS servers do not accept changes to the DNS tables via Dynamic DNS updates. Since there is ordinarily only one primary authoritative DNS server per DNS zone, if the primary server goes down, Dynamic DNS updates will not be able to proceed. This can be problematic for protocols requiring high availability, such as VoIP and Mobile IP. In one conventional system (hereinafter the Multi-master approach), high availability is achieved by utilizing multiple primary authoritative DNS servers which all write to a common Lightweight Directory Access Protocol (LDAP) distributed database. Similar systems use Active Directory as this LDAP distributed database. Active Directory is a trademark of Microsoft Corporation or Redmond, Wash. The LDAP distributed database allows the primary servers to periodically communicate with each other to synchronize their databases using multi-master replication. In another conventional system (hereinafter the Central DB approach), high availability is achieved by allowing secondary authoritative DNS servers to accept DNS changes. In this approach, each DNS server to accept a change temporarily stores the change in its database, and propagates the change to a common database that implements the change, and propagates the change down to all the primary and secondary DNS servers. Similar systems use an Oracle® database. Oracle® is a registered trademark of Oracle Corporation of Redwood Shores, Calif. Once the change propagates down, the temporary change is deleted.

BRIEF DESCRIPTION OF THE DRAWINGS

Objects, features and advantages of particular embodiments of the invention will be apparent from the following description, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Figure 1:
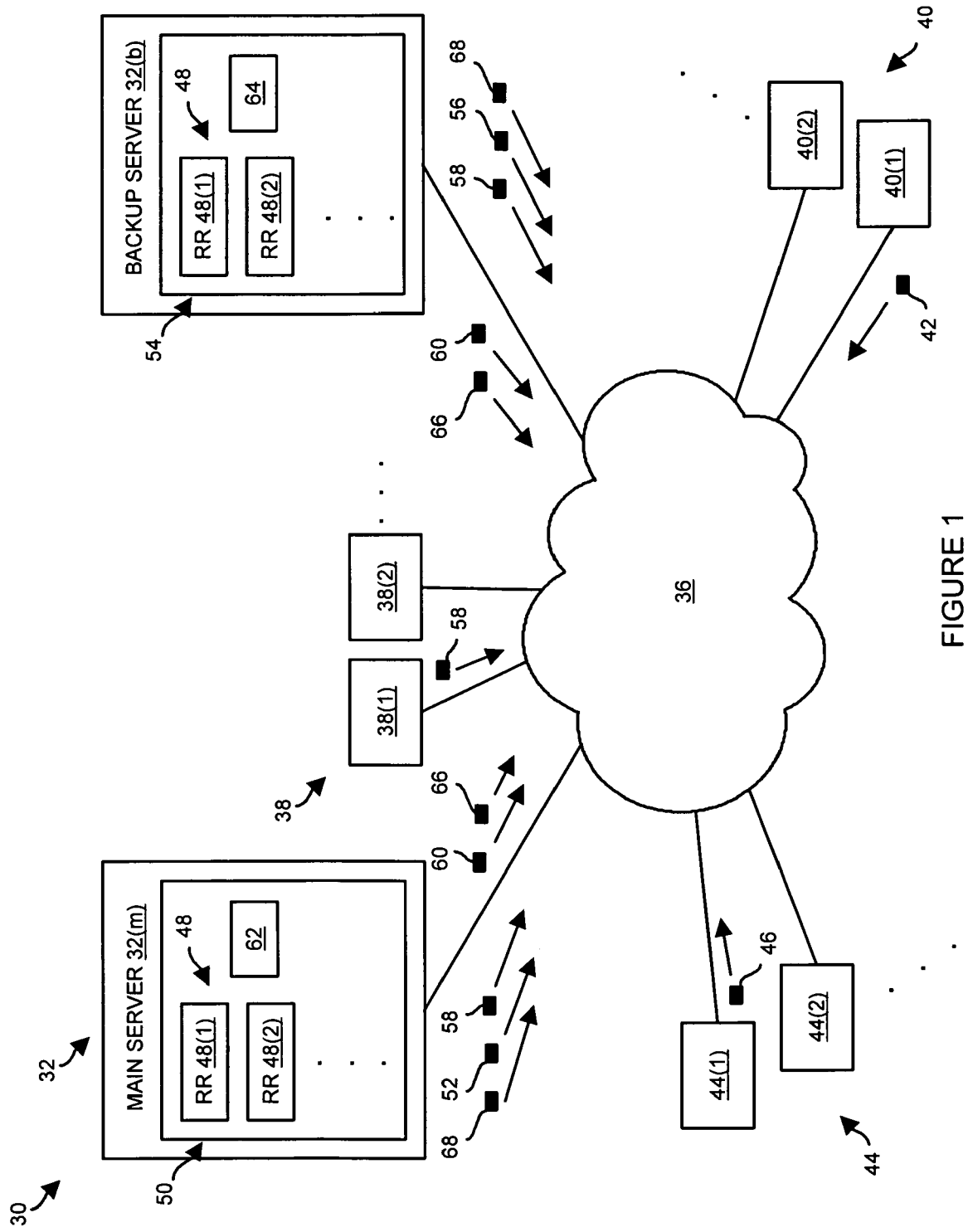
FIG. 1 illustrates an example system for use by various embodiments.

Certain embodiments of the present invention provide improved methods for providing high availability in a DNS. Other embodiments are directed at apparatus for use in these methods.

The above-described prior art approaches are deficient. In particular, the Multi-master approach is defective because the possibility exists that one primary DNS server will implement a DNS change, and then several minutes later, a second primary DNS server could make a conflicting DNS change before receiving notification of the first change through the multi-master replication (which typically takes at least several minutes to cycle through the entire LDAP distributed database). In multi-master replication the last change always wins. However, the first change may have already been externally published to secondary DNS servers and other clients. This may lead to data inconsistencies. In addition, the zone serial numbers (which are used to count changes in a zone) on two primary servers could be the same, even though the servers have implemented different DNS changes, further causing problems for updates to the secondary DNS servers. The Multi-master approach is also defective because LDAP distributed databases suffer from scalability limitations.

The Central DB approach also suffers from deficiencies. In particular, the same sort of data inconsistency problems as described above could occur. Two secondary servers could both accept DNS changes and publish them before the accepted changes from the central database have propagated down to all the secondary servers. Meanwhile, one secondary server has already published a change which will ultimately be rejected.

In contrast to the above-described prior art approaches, particular embodiments of the present invention eliminate or reduce the frequency of data inconsistencies while maintaining high availability. In addition, particular embodiments of the present invention also correct any incurred data inconsistencies by forcing full DNS zone transfers to the secondary servers at strategic times.

In one embodiment, only one primary authoritative DNS server is configured to accept changes to the DNS. This server is referred to as a main primary server. In addition, one or more backup primary DNS servers are configured to serve DNS query requests. The backup primary servers, while in normal operating mode, do not accept changes to the authoritative DNS zone data. The backup primary servers maintain periodic communication with the main primary server, and if contact with the main primary server is lost (as due to failure of the main primary or network partition), then a backup primary server assumes active status and may accept changes to the authoritative DNS zone data. Once communication with the main primary server is restored, a synchronization state is entered, during which no DNS changes are accepted. During the synchronization state, the active backup primary server and the main primary server synchronize their zone data. After the data is synchronized, the main primary server resumes its role as the sole active primary server, accepting and managing DNS zone data changes.

DESCRIPTION OF EXAMPLE EMBODIMENTS

Certain embodiments are directed to a method performed by a main primary DNS name server. Other embodiments are directed to a method performed by a backup primary DNS server. Other embodiments are directed to the apparatus of main and backup primary DNS servers.

FIG. 1 depicts an example system 30 for use by various embodiments. The system 30 includes a main primary DNS name server 32(m) and a backup primary DNS name server 32(b) (collectively primary DNS name servers 32) connected to a network 36. Various secondary DNS name servers 38(1), 38(2), . . . (generally secondary DNS name servers 38) also connect to the network 36. Hosts 40 on the network 36 desiring to resolve the network address of a domain name issue DNS queries 42 directed at any of the primary DNS name servers 32 or the secondary DNS name servers 38. DNS clients 44 on the network 36 issue DNS update request messages 46 to the main primary DNS name server 32(m) in order to request a new domain name, associate a domain name with a new network address, delete a previous network address associated with a domain name, etc. (Some hosts 40 may also be DNS clients 44, and some DNS clients 44 may also be hosts 40). However, in the event that the main primary DNS name server 32(m) is not reachable, the DNS update request messages 46 may instead be directed to the backup primary DNS name server 32(b).

In the normal case, upon receiving a DNS update request message 46, the main primary DNS name server 32(m) attempts to fulfill the request by deleting or adding one or more resource records 48 in its DNS database 50. If the main primary DNS name server 32(m) is able to fulfill the request, it must confirm the change with the backup primary DNS name server 32(b) before responding back to the DNS client that the change has been made. The main primary DNS name server 32(m) sends a Resource Record Update (RR-Update) message 52 to the backup primary DNS name server 32(b) directing the backup primary DNS name server 32(b) to update its DNS database 54 in the same manner as the DNS database 50 within the main primary DNS name server 32(m). Once the backup primary DNS name server 32(b) updates its DNS database 54, the backup primary DNS name server 32(b) sends a confirmation signal 56 back to the main primary DNS name server 32(m). Upon receiving the confirmation signal 56, the main primary DNS name server 32(m) issues a DNS update response message 58 to the requesting DNS client 44.

In order to confirm that both primary DNS name servers 32 are operating, in the event that no RR-Update messages 52 or confirmation signals 56 are received in a specified period of time (for example, every 10 seconds), the main primary DNS name server 32(m) may be configured to send a heartbeat message 60 to the backup primary DNS name server 32(b). If the main primary DNS name server 32(m) does not receive a response to a heartbeat message 60, the main primary DNS name server 32(m) may assume that the backup primary DNS name server 32(b) is off-line, and therefore, the main primary DNS name server 32(m) enters a Communication-Interrupted state. While in the Communication-Interrupted state, the main primary DNS name server 32(m) may continue to operate as normal except that it need not send RR-Update messages 52 to the backup primary DNS name server 32(b), nor need it await a confirmation signal 56 before responding back to a requesting client 44. In addition, while in the Communication-Interrupted state, the main primary DNS name server 32(m) records supplementary information 62 in the DNS database 50 as it is modified.

The backup primary DNS name server 32(b) may also periodically send a heartbeat message 60 to the main primary DNS name server 32(m). If the backup primary DNS name server 32(b) does not receive a response to the heartbeat message 60, the backup primary DNS name server 32(b) may assume that the main primary DNS name server 32(m) is off-line, and therefore, the backup primary DNS name server 32(b) enters a Communication-Interrupted state. While in the Communication-Interrupted state, the backup primary DNS name server 32(b) assumes active primary status. While operating under the active primary status, the backup primary DNS name server 32(m) may process and respond to DNS update request messages 46. In addition, while in the Communication-Interrupted state, the backup primary DNS name server 32(b) records supplementary information 64 in the DNS database 54 as it is modified. Further details of the Communication-Interrupted state will be provided below.

Once communication between the primary DNS name servers 32 is restored, a Synchronization state is entered by both machines. While in the Synchronization state, the primary DNS name servers 32 exchange synchronization information 66. Further details of the Synchronization state will be provided below.

Once the Synchronization state has completed successfully, the primary DNS name servers 32 resume normal operation. Once normal operation has resumed, the primary DNS name servers 32 typically update the secondary DNS name servers 58 to ensure that every secondary DNS name server 58 has all of the newly synchronized DNS data. This updating is typically done via DNS zone transfer messages 68 between the primary DNS name servers 32 and the secondary DNS name servers 38.

Primary Server Architecture

Figure 2:
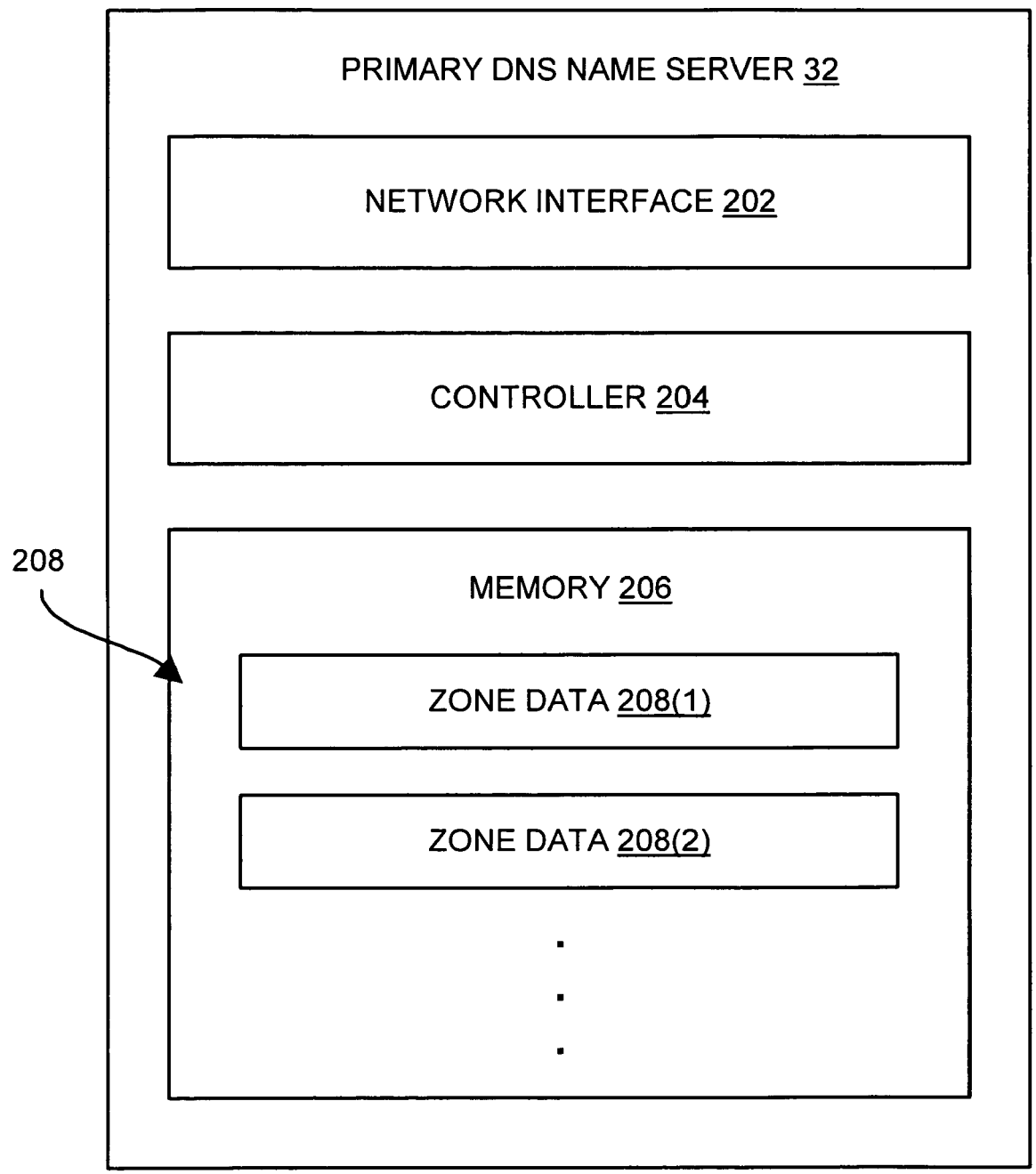
FIG. 2 illustrates an example primary server of one embodiment.
Figure 3:
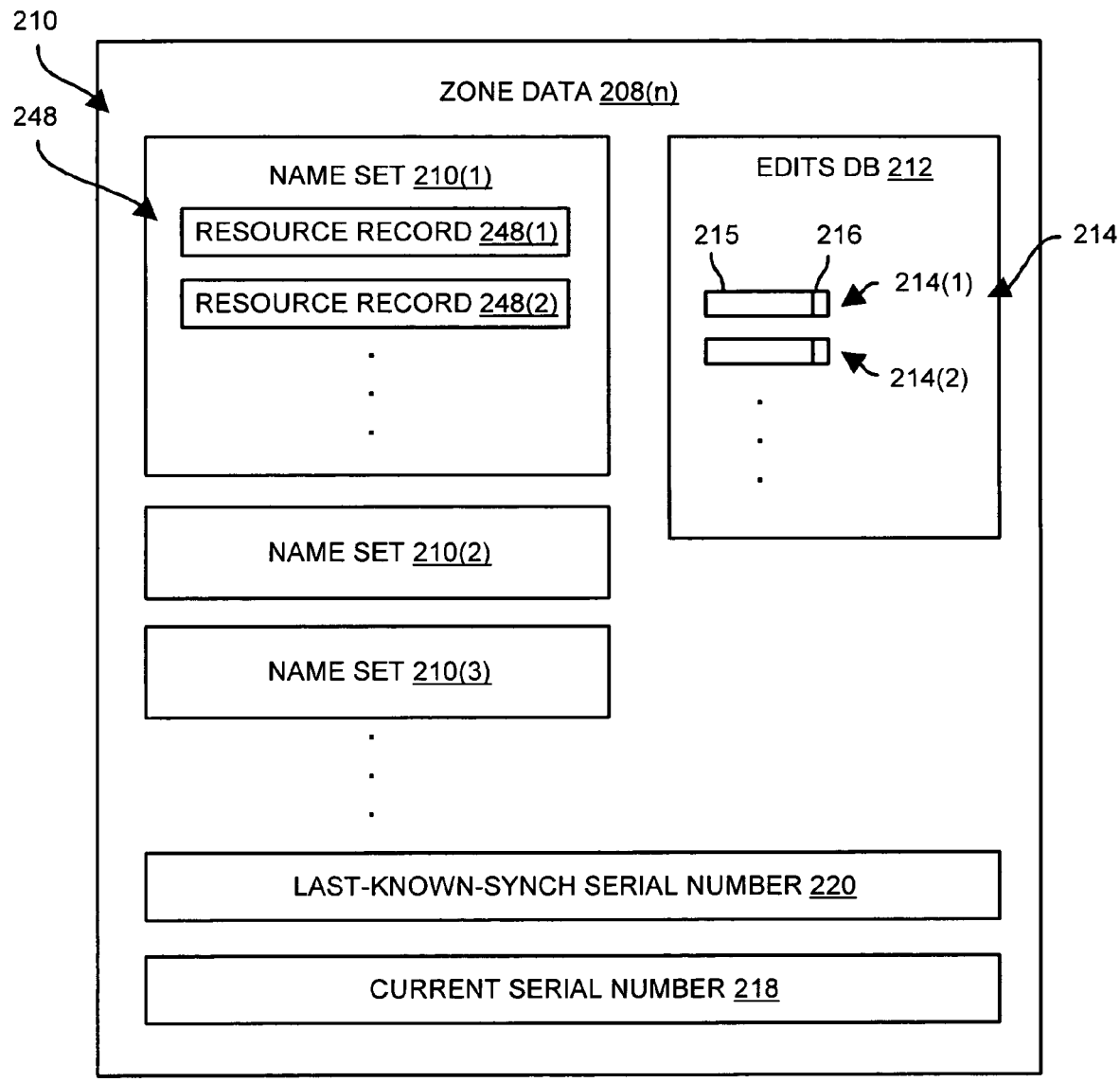
FIG. 3 illustrates more detail with respect to zone data contained within the example primary server of FIG. 2.

FIG. 2 depicts an example primary DNS name server 32. The primary DNS name server 32 contains a network interface 202, a controller 204, and a memory 206. The network interface 202 may receive signals from and send signals to the network 36. The network interface 202 provides an interface between the network 36 and the controller 204. The memory 206 may include both a Random Access Memory (RAM) portion (e.g., semiconductor memory) and a data storage portion (e.g., non-volatile disk-based storage). The memory 206 maintains a DNS database 50, 54 (see FIG. 1) by storing information about DNS zones that the primary DNS name server 32 manages. The DNS database 50, 54 stores DNS data for each zone in a collection of zone databases 208(1), 208(2), . . . (generally zone databases 208). Further detail of a zone database 208 is provided in FIG. 3.

Each zone database 208 stores zone data about a particular DNS zone. Each zone database 208 stores information about the domains in the zone in a set of resource records 248(1), 248(2), . . . (generally resource records 248). The set of resource records 248 may logically be subdivided into subsets, each subset containing resource records all having the same name data. These subsets are referred to as name-sets 210(1), 210(2), 210(3), . . . (generally name-sets 210). Each zone database 208 also contains an Edits Database 212. The Edits Database 212 contains a list of entries 214(1), 214(2), . . . (generally entries 214), each entry containing the name 215 of a name-set 210 that has been modified (having had a resource record 208 added or deleted) since the primary DNS name servers 32 last synchronized with each other (although in the backup primary DNS name server 32(b) the Edits Database 212 may only be populated while in Communications-Interrupted state, since the backup primary DNS name server 32(b) does not modify resource records except upon instructions from the main primary DNS name server 32(m)). Each entry 214 in the Edits Database 212 also contains a deletion flag 216. The deletions flag 216 is flagged if the name-set 210 associated with the name 215 stored in each entry 214 of the Edits Database 212 has had a resource record 248 deleted since the primary DNS name servers 32 last synchronized with each other.

Each zone database 208 also contains a current serial number 218 and a last-known-synchronization serial number 220. These serial numbers may be 32-bit numbers, as serial numbers are commonly implemented. However, in order to reduce the likelihood of overflow and wrapping, these serial numbers may also be 64-bit numbers. In that case, the lower 32 bits represent a sequence value, compatible with prior systems, while the upper 32 bits represent a generation value that allow the controller to determine if the sequence value has overflowed and wrapped.

Method of Operation

Figure 4:
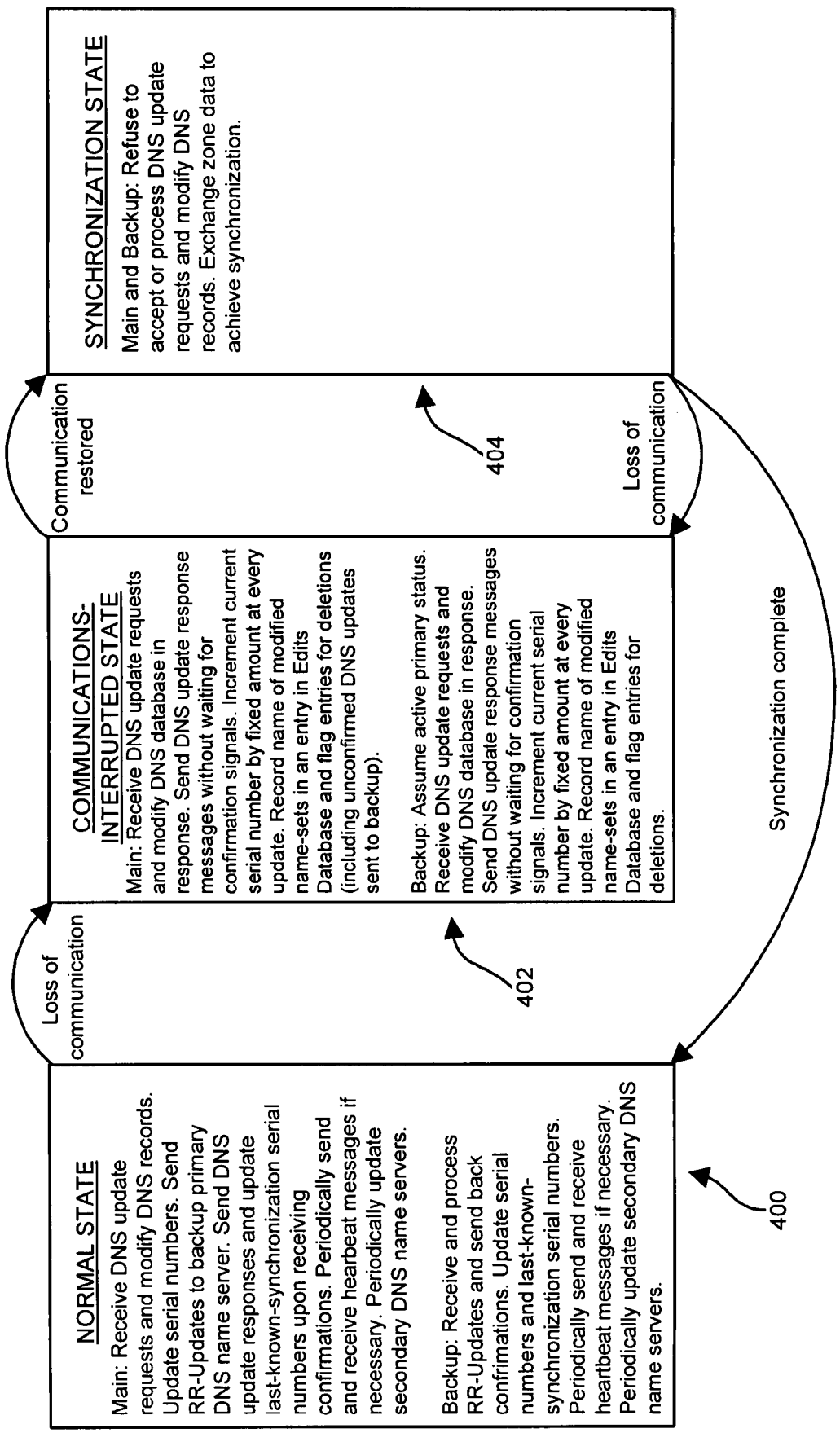
FIG. 4 illustrates a method of an example embodiment.

FIG. 4 depicts the various states that the primary DNS name servers 32 may be in and the transitions therebetween. In the normal condition, each primary DNS name server 32 remains in a Normal state 400. While in the Normal state 400, each primary DNS name server 32 (as well as the secondary name servers 38) may accept, process, and respond to DNS queries from hosts 40 desiring to resolve the network address of a domain name.

In the Normal state 400, the main primary DNS name server 32(m) receives DNS update requests 46 from DNS clients 44. The main primary DNS name server 32(m) modifies its DNS database 50 in response to the requests 46 and sends RR-Update messages 52 to the backup primary DNS name server 32(b) to disseminate the changes to the DNS information. Every time the main primary DNS name server 32(m) modifies its DNS database 50, the main primary DNS name server 32(m) increments by a fixed number (for example, the number one) the current serial number 218 of the zone in whose zone database 208 the change was made. In order to avoid inefficiencies associated with continuous communication between the primary DNS name servers 32, the main primary DNS name server 32(m) may queue several RR-Update messages 52 and send them in batch at fixed intervals (for example, once per second). Once the main primary DNS name server 32(m) receives a confirmation signal 56 from the backup primary DNS name server 32(b), the main primary DNS name server 32(m) sends a DNS update response message 58 to the requesting DNS client 44. Upon receiving a confirmation signal, the main primary DNS name server 32(m) also updates the last-known-synchronization serial number 220 of the zone in whose zone database 208 the change was made. If at the scheduled time to send queued RR-Update the main primary DNS name server 32(m) does not have any queued RR-Update to send, the main primary DNS name server 32(m) instead sends a heartbeat message 60 to the backup primary DNS name server 32(b). If the backup primary DNS name server 32(b) does not respond to an RR-Update message 52 with a confirmation signal 56 or respond to a heartbeat message 60 within a fixed interval of time (for example, 5 seconds), the main primary DNS name server 32(m) enters the Communications-Interrupted state 402.

In the Normal state 400, the backup primary DNS name server 32(b) receives RR-Update messages 52 from the main primary DNS name server 32(m). The backup primary DNS name server 32(b) modifies its DNS database 54 in response to the RR-Update messages 52 and sends confirmation signals 56 back to the main primary DNS name server 32(m). Every time the backup primary DNS name server 32(b) modifies its DNS database 54 in response to an RR-Update message 52, the backup primary DNS name server 32(b) updates the current serial number 218 of the zone in whose zone database 208 the change was made with the current serial number 218 provided by the main primary DNS name server 32(m) and saves that current serial number as a last-known-synchronization serial number 220. This allows the current serial number 218 of each zone database 208 to remain synchronized between the primary DNS name servers 32. In addition, if the backup primary DNS name server 32(b) has not received any communication from the main primary DNS name server 32(m) in a set period of time (for example, 10 seconds), the backup primary DNS name server 32(b) sends a heartbeat message 60 to the main primary DNS name server 32(m). If the main primary DNS name server 32(m) does not respond to the heartbeat message 60 within a fixed interval of time (for example, 5 seconds), the backup primary DNS name server 32(b) enters the Communications-Interrupted state 402.

In the Communications-Interrupted state 402, each operational primary DNS name server 32 (as well as the secondary name servers 38) may accept, process, and respond to DNS queries from hosts 40 desiring to resolve the network address of a domain name.

In the Communications-Interrupted state 402, the main primary DNS name server 32(m), if operational, may receive DNS update requests 46 from DNS clients 44. The main primary DNS name server 32(m) modifies its DNS database 50 in response to the requests 46 and sends a DNS update response message 58 to the requesting DNS client 44 without waiting for a confirmation signal 56 from the backup primary DNS name server 32(b). Every time the main primary DNS name server 32(m) modifies its DNS database 50, the main primary DNS name server 32(m) increments by a fixed number (for example, the number one) the current serial number 218 of the zone in whose zone database 208 the change was made. In addition, when the main primary DNS name server 32(m) modifies its DNS database 50, the main primary DNS name server 32(m) modifies the Edits Database 212 within the zone database 208 that was modified. The name 215 of the name-set 210 that was modified in the zone database 208 is recorded in an entry 214 within the Edits Database 212. If a resource record 216 was deleted within the name-set 210, then the deletions flag 216 is flagged in the entry 214 as well. In addition, if there are any DNS updates which the main primary DNS name server 32(m) had already sent to the backup primary DNS name server 32(b) in an RR-Update message 52, but which the backup primary DNS name server 32(*b*) has not yet confirmed, the name-sets modified by these changes must also be added to the Edits Database in the same manner.

In the Communications-Interrupted state 402, the backup primary DNS name server 32(*b*), if operational, assumes active primary status and may receive DNS update requests 46 from DNS clients 44. The backup primary DNS name server 32(*b*) modifies its DNS database 54 in response to the requests 46 and sends a DNS update response message 58 to the requesting DNS client 44 without waiting for any confirmation signal 56. Every time the backup primary DNS name server 32(*b*) modifies its DNS database 54, the backup primary DNS name server 32(*b*) increments by a fixed number (for example, the number one) the current serial number 218 of the zone in whose zone database 208 the change was made. In addition, when the backup primary DNS name server 32(*b*) modifies its DNS database 54, the backup primary DNS name server 32(*b*) modifies the Edits Database 212 within the zone database 208 that was modified. The name 215 of the name-set 210 that was modified in the zone database 208 is recorded in an entry 214 within the Edits Database 212. If a resource record 216 was deleted within the name-set 210, then the deletions flag 216 is flagged in the entry 214 as well.

It should be noted that it is possible for both primary DNS name servers 32 to be in the Communication-Interrupted state 402 simultaneously. This can happen if, for example, a network partition occurs and the primary DNS name servers 32 are unable to communicate with each other. Because of this possibility, both primary DNS name servers 32 may accept and process DNS update requests at the same time. This makes the synchronization procedure more complicated than it would be if only one primary name server 32 were able to modify the DNS zone data at a time.

Figure 5:
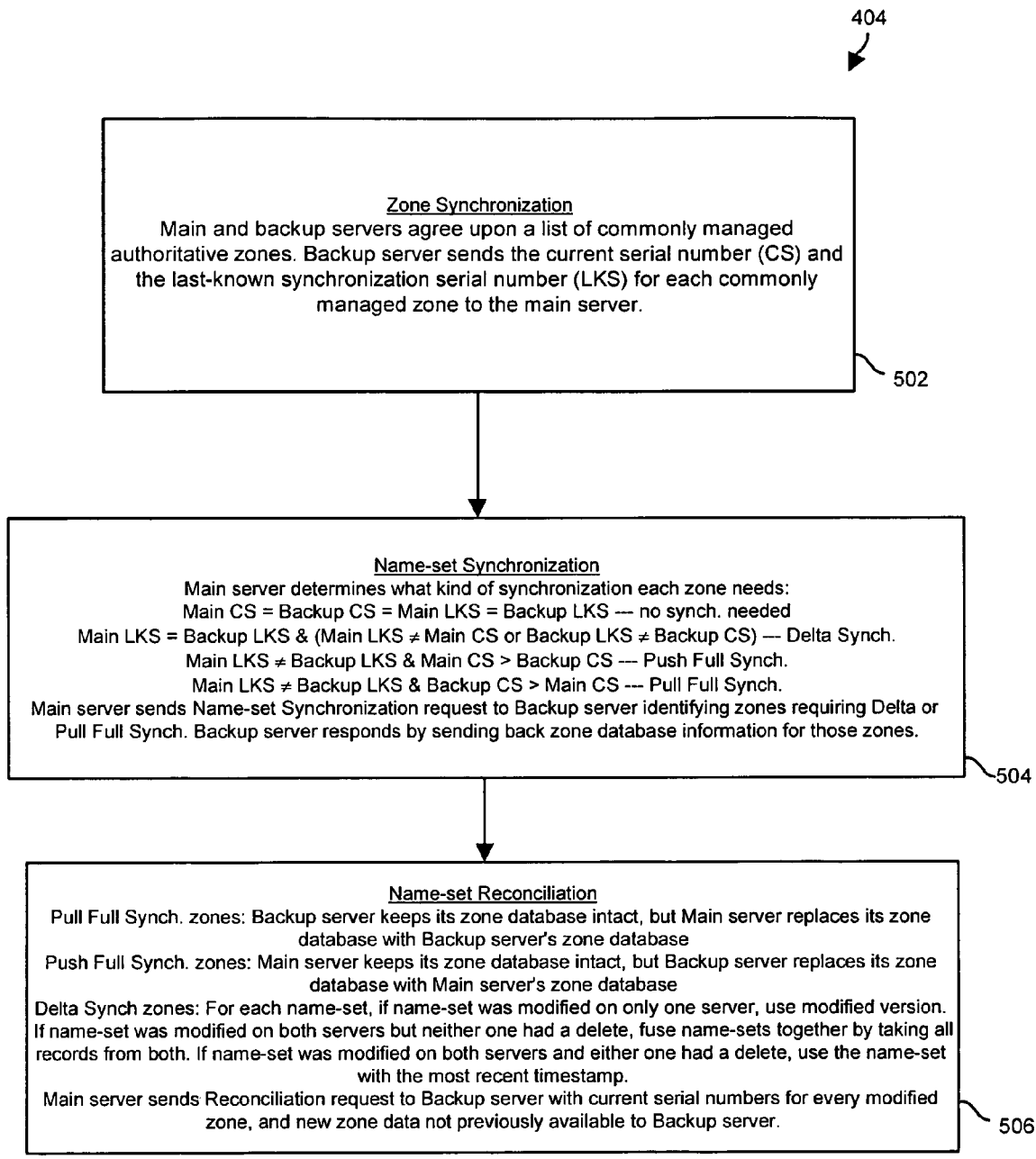
FIG. 5 illustrates the Synchronization of FIG. 4 in further detail.

Once communications are restored between the primary DNS name servers 32, the primary DNS name servers 32 enter a Synchronization state 404. In the Synchronization state 404, each primary DNS name server 32 (as well as the secondary name servers 38) may accept, process, and respond to DNS queries from hosts 40 desiring to resolve the network address of a domain name. In the Synchronization state 404, the primary DNS name servers 32 refuse to accept and process any DNS update request messages 46. The primary DNS name servers 32 exchange zone data in order to synchronize their DNS databases. Once the synchronization is complete, the primary DNS name servers 32 return to the Normal state 400. If, however, communications between the primary DNS name servers 32 is again interrupted before the synchronization is complete, then the primary DNS name servers 32 re-enter the Communications-Interrupted state 402. Further details of the synchronization are illustrated in FIG. 5.

The synchronization procedure may be accomplished in several steps. As illustrated in FIG. 5, it includes Zone Synchronization 502, Name-set Synchronization 504, and Name-set Reconciliation 506.

In Zone Synchronization 502, the primary DNS name servers 32 agree upon a list of commonly managed authoritative DNS zones. The main primary DNS name server 32(*m*) sends the backup primary DNS name server 32(*b*) a Zone Synchronization request containing a list of all primary zones that it maintains authoritatively. The backup primary DNS name server 32(*b*) compares this list to the primary zones that the backup primary DNS name server 32(*b*) maintains authoritatively. The backup primary DNS name server 32(*b*) disables any local zones that were not listed in the Zone Synchronization request, and the backup primary DNS name server 32(*b*) flags any zones that are not managed authoritatively by the backup primary DNS name server 32(*b*), before sending the list back to the main primary DNS name server 32(*m*). This list (excluding the flagged zones) represents the agreed-upon list of commonly managed zones. The backup primary DNS name server 32(*b*) also sends the last-known-synchronization serial number 220 and the current serial number 218 of each zone on the agreed-upon list of commonly managed zones to the main primary DNS name server 32(*b*).

The primary DNS name servers 32 then perform Name-set Synchronization 504. In Name-set Synchronization 504, the main primary DNS name server 32(*m*) decides how to synchronize each zone. For each zone, the main primary DNS name server 32(*m*) compares the last-known-synchronization serial number 220 from each of the primary DNS name servers 32 and the current serial number 218 from each of the primary DNS name servers 32. If all four numbers are equal, then the zone has not been modified since the primary DNS name servers 32 were last synchronized, and no further synchronization is necessary. If the last-known-synchronization serial numbers 220 are the same, but at least one of the current serial numbers 218 differs from the last-known-synchronization serial number 220, then the zone has evolved on at least one primary DNS name server 32 since the primary DNS name servers 32 were last synchronized. In that event, the zone is flagged as requiring Delta Synchronization (in which case the zone contents must be merged on a name-set by name-set basis).

If the last-known-synchronization serial numbers 220 from each of the primary DNS name servers 32 differ from each other, then the zones had not properly achieved synchronization. That situation can arise, for example, when a zone is newly added, when data on one of the primary DNS name servers 32 was restored from an old disk-image, or when data has become corrupted. In any of those cases, the zone data from the primary DNS name servers 32 cannot be merged properly. Therefore, whichever primary DNS name server 32 has a more recent (higher) current serial number 218 (implying that more modifications have occurred on that primary DNS name server 32) will have to provide the data for that zone. Therefore, when the last-known-synchronization serial number 220 from each of the primary DNS name servers 32 differ from each other, the current serial numbers 218 from each of the primary DNS name servers 32 are compared. If the current serial numbers 218 from the main primary DNS name server 32(*m*) is greater, then the zone is flagged as requiring Push Full Synchronization (in which case the entire zone contents must be sent to the backup primary DNS name server 32(*b*)). If the current serial number 218 from the backup primary DNS name server 32(*b*) is greater, then the zone is flagged as requiring Pull Full Synchronization (in which case the entire zone contents must be sent from the backup primary DNS name server 32(*b*) to the main primary DNS name server 32(*m*)).

The main primary DNS name server 32(*m*) sends a Name-set Synchronization request to the backup primary DNS name server 32(*b*). The Name-set Synchronization request identifies every zone that requires Pull Full Synchronization or Delta Synchronization. The backup primary DNS name server 32(*b*) then responds by sending back a Name-set Synchronization response. For each zone requiring Delta Synchronization, the Name-set Synchronization response contains the Edits Database 212 as well as all resource records 248 making up all name-sets 210 that were modified since the last time the primary DNS name servers 32 were synchronized (as determined by reference to the Edits Database 212). It also contains all resource records 248 from each zone requiring Pull Full Synchronization.

The primary DNS name servers 32 then perform Name-set Reconciliation 506. In Name-set Reconciliation 506, the main primary DNS name server 32(*m*) constructs synchronized zones in its own DNS database 50, and sends a Reconciliation request to the backup primary DNS name server 32(*b*) based on the form of synchronization required by each zone.

For zones requiring Pull Full Synchronization, the main primary DNS name server 32(*m*) replaces the resource records 248, the current serial number 218, and the last-known-synchronization serial number 220 of its zone database with the resource records 248, the current serial number 218, and the last-known-synchronization serial number 220 of the zone database of the backup primary DNS name server 32(*b*). It also adds a record into the Reconciliation request having a marker which notes a new serial number for that zone.

For zones requiring Push Full Synchronization, the main primary DNS name server 32(*m*) adds a record into the Reconciliation request having a marker which notes a new serial number for that zone. The main primary DNS name server 32(*m*) also adds the entire contents of its zone database 208 for that zone.

For zones requiring Delta Synchronization, the main primary DNS name server 32(*m*) constructs a merged zone database 208. The main primary DNS name server 32(*m*) compares the Edits Databases 212 from both primary DNS name servers 32. For every name-set 210 that was listed as modified by the backup primary DNS name server 32(*b*) but not by the main primary DNS name server 32(*m*), the main primary DNS name server 32(*m*) replaces the name-set 210 in its own zone database 208 with the name-set 210 from the backup primary DNS name server 32(*b*). For every name-set 210 that was listed as modified by the main primary DNS name server 32(*m*) but not by the backup primary DNS name server 32(*b*), the main primary DNS name server 32(*m*) preserves the name-set 210 in its own zone database 208 without alteration, and (as described below) sends a copy of its name-set 210 to the backup primary DNS name server 32(*b*).

For every name-set 210 that was listed as modified by the backup primary DNS name server 32(*b*) and by the main primary DNS name server 32(*m*), the main primary DNS name server must decide how to merge the sets. If neither primary DNS name server 32 deleted any resource records 248 in the name-set 210 since the last time the primary DNS name servers 32 were synchronized (as determined by reference to the deletion flags 216 in the Edits Databases 212), then the main primary DNS name server 32(*m*) fuses the two name-sets 210 together by adding every record from the name-set 210 from the backup primary DNS name server 32(*b*) to the name-set 210 in its own zone database 208 (thereby forming a larger name-set 210).

If either primary DNS name server 32 deleted any resource records 248 in the name-set 210 since the last time the primary DNS name servers 32 were synchronized, then the main primary DNS name server 32(*m*) selects whichever name-set has a later time-stamp (i.e., the one which was updated last). If the last-modified name-set is the name-set from the backup primary DNS name server 32(*b*), then the main primary DNS name server 32(*m*) replaces the name-set 210 in its own zone database 208 with the name-set 210 from the backup primary DNS name server 32(*b*). If the last-modified name-set is the name-set 210 from the main primary DNS name server 32(*m*), then the main primary DNS name server 32(*m*) preserves the name-set 210 in its own zone database 208 without alteration, and (as described below) sends a copy of its name-set 210 to the backup primary DNS name server 32(*b*).

For each zone requiring Delta Synchronization, the main primary DNS name server 32(*m*) adds a record into the Reconciliation request having a marker which notes a serial number for that zone. The main primary DNS name server 32(*m*) also adds in a complete copy of every reconciled name-set 210 from its own zone database 208 that differs from what the backup primary DNS name server 32(*b*) has. Thus, if a name-set 210 was only modified on the main primary DNS name server 32(*m*), the record in the Reconciliation request will include a complete copy of that name-set 210 from the main primary DNS name server 32(*m*). Similarly, if a name-set 210 was modified on both primary DNS name servers 32, one of the name-sets 210 had a delete, and the version from the main primary DNS name server 32(*m*) has a later time-stamp, the record in the Reconciliation request will include a complete copy of that name-set 210 from the main primary DNS name server 32(*m*). Similarly, if a name-set 210 was modified on both primary DNS name servers 32 and neither one of the name-sets 210 had a delete, then the record in the Reconciliation request will include a complete copy of that name-set 210 from the main primary DNS name server 32(*m*) (which has now already been fused with the version from the backup primary DNS name server 32(*b*)).

Upon receiving the Reconciliation request, the backup primary DNS name server 32(*b*) replaces all of its zone databases 208, zone serial numbers 218, last-known-synchronization serial numbers 220, and/or name-sets 210 that were provided in the Reconciliation request with the zone databases 208, zone serial numbers 218, and/or name-sets 210 that were provided in the Reconciliation request. After doing so, the primary DNS name servers 32 are fully synchronized, and they may re-enter the Normal State.

In one embodiment, once the primary DNS name servers 32 re-enter the Normal state, the primary DNS name servers 32 force full zone transfers to the secondary DNS name servers 38 using full DNS zone transfer.

CONCLUSION

Thus, embodiments of the present invention provide improved methods for operating highly available primary DNS name servers 32. Other embodiments provide improved methods for synchronizing primary DNS name servers 32 after one shuts down or a network partition separates them. Other embodiments are directed to the apparatus of a primary DNS server 32.

While various embodiments of the invention have been particularly shown and described, it will be understood by those skilled in the art that various changes in form and details may be made therein without departing from the spirit and scope of the invention as defined by the appended claims.

For example, embodiments have been described as having two primary DNS name servers 32. However, other embodiments may have more than two primary DNS name servers 32, for example there may be one main primary DNS name server 32(*m*) and two backup primary DNS name servers 32(*b*).

As an additional example, embodiments have been described as performing the various types of Synchronization by means of a particular exchange of Synchronization requests and responses. However, different forms of exchanges may also be utilized.

As an additional example, embodiments have been described as having three operating states: a Normal state 400, a Communications-Interrupted state 401, and a Synchronization state 402. However, additional operating states may be used as well. For example, each primary DNS name server 32 may be configured to additionally operate in a Partner-Down state. An administrator may place a primary DNS name server 32 in the Partner-Down state when the other primary DNS name server 32 is expected to be off-line for an extended period of time. In this Partner-Down state, the primary DNS name server 32 assumes active primary status, but neglects to track changes to the DNS database, because a full-zone synchronization will be performed when the other primary DNS name server 32 returns to duty.

In addition, the primary DNS name servers 32 may also perform additional functions. For example, a primary DNS name server 32 in the synchronization state may accept a DNS update request message 46 from an augmented DNS client in order to inform the augmented DNS client that the primary DNS name servers 32 are currently performing synchronization and are therefore unavailable, as described in "COMMUNICATING ADDITIONAL INFORMATION IN A DNS UPDATE RESPONSE BY REQUESTING DELETION OF A SPECIFIC RECORD," a U.S. Patent Application filed on Oct. 24, 2006 having Ser. No. 11/585,560, the teachings of which are hereby incorporated by reference in their entirety.

What is claimed is:

1. A main primary Domain Name System (DNS) name server, comprising:
   a network interface;
   memory; and
   a controller coupled to the network interface and the memory, the controller being configured to:
      receive a DNS update sent from a DNS client to the main primary DNS name server through the network interface;
      directly modify a main DNS record in the memory based on the DNS update;
      direct a backup primary DNS name server to modify a backup DNS record based on the DNS update through the network interface while both the main primary DNS name server and the backup primary DNS name server (i) are configured to distribute DNS information to secondary DNS name servers and DNS clients and (ii) are in ongoing communication with each other, the backup primary DNS name server being configured to receive DNS updates sent from the DNS clients to the backup primary DNS name server and modify backup DNS records based on the DNS updates in response to a loss of communication between the main primary DNS name server and the backup primary DNS name server;
      communicate with the backup primary DNS name server to maintain the main primary DNS name server in a normal operating state in which the main primary DNS name server waits to receive confirmation that the backup DNS record has been modified by the backup primary DNS name server prior to acknowledging completion of the DNS update to the DNS client;
      in response to a loss of communications between the main primary DNS name server and the backup primary DNS name server, transition the main primary DNS name server from the normal operating state to a communications interrupted state in which the main primary DNS name server acknowledges subsequent DNS updates sent from the DNS clients to the main primary DNS name server without waiting for confirmation from the backup primary DNS name server;
      in response to reestablishment of communications between the main primary DNS name server and the backup primary DNS name server, transition the main primary DNS name server from the communications interrupted state to a synchronization state in which the main primary DNS name server and the backup primary DNS name server synchronize the DNS information; and
      while the main primary DNS name server is in the synchronization state, synchronize the DNS information based on zone data serial numbers;
   wherein the controller, when synchronizing the DNS information based on zone data serial numbers, is configured to:
      in a zone synchronization phase, identify a common set of authoritative primary zones which were modified while the main primary DNS name server was in the communications interrupted state.

2. The main primary DNS name server of claim 1 wherein the controller is further configured to:
   after synchronization of the DNS information is complete, transition the main primary DNS name server from the synchronization state to the normal operating state in which the main primary DNS name server waits to receive confirmation that further backup .DNS records have been modified by the backup primary DNS name server prior to acknowledging completion of further DNS updates to the DNS client.

3. The main primary DNS name server of claim 1 wherein the DNS information includes modified zone data, and wherein the controller is further configured to:
   after synchronization of the DNS information is complete, induce the secondary DNS name servers to carry out full zone transfer operations to acquire the modified zone data.

4. The main primary DNS name server of claim 1 wherein the controller, when synchronizing the DNS information based on zone data serial numbers, is configured to:
   in a name set synchronization phase, create an authoritative version of the DNS information within the main primary DNS name server at a name set level.

5. The main primary DNS name server of claim 4 wherein the controller, when synchronizing the DNS information based on zone data serial numbers, is configured to:
   in a name set reconciliation phase, correspond with the backup primary DNS name server to create an authoritative version of the DNS information within the backup primary DNS name server.

6. The main primary DNS name server of claim 1 wherein while the main primary DNS name server is maintained in a normal operating state, the backup primary DNS name server is configured to refrain from modifying the backup DNS records based on DNS updates sent from the DNS clients to the backup primary DNS name server.

7. A main primary Domain Name System (DNS) name server, comprising:
   a network interface;
   memory; and
   a controller coupled to the network interface and the memory, the controller being configured to:
      receive a DNS update sent from a DNS client to the main primary DNS name server through the network interface;
      directly modify a main DNS record in the memory based on the DNS update;
      direct a backup primary DNS name server to modify a backup DNS record based on the DNS update through the network interface while both the main primary DNS name server and the backup primary DNS name server (i) are configured to distribute DNS information to secondary DNS name servers and DNS clients and (ii) are in ongoing communication with each other, the backup primary DNS name server being configured to receive DNS updates sent from the DNS clients to the backup primary DNS name server and modify backup DNS records based on the DNS updates in response to a loss of communication between the main primary DNS name server and the backup primary DNS name server;

in response to a loss of communications between the main primary DNS name server and the backup primary DNS name server, transition the main primary DNS name server from a normal operating state to a communications interrupted state in which the main primary DNS name server acknowledges subsequent DNS updates sent from the DNS clients to the main primary DNS name server without waiting for confirmation from the backup primary DNS name server;

in response to reestablishment of communications between the main primary DNS name server and the backup primary DNS name server, transition the main primary DNS name server from the communications interrupted state to a synchronization state in which the main primary DNS name server and the backup primary DNS name server synchronize the DNS information; and while the main primary DNS name server is in the synchronization state, synchronize the DNS information based on zone data serial numbers;

wherein the main primary DNS name server has a main last-known-synchronization serial number and a main current serial number for a particular zone;

wherein the backup primary DNS name server has a backup last-known-synchronization serial number and a backup current serial number for the particular zone; and wherein the controller, when synchronizing the DNS information based on zone data serial numbers, is configured to compare: (i) the main last-known-synchronization serial number for the particular zone to the backup last-known-synchronization serial number for the particular zone, (ii) the main current serial number for the particular zone to the main last-known-synchronization serial number for the particular zone, and (iii) the backup current serial number for the particular zone to the backup last-known-synchronization serial number for the particular zone to determine whether to synchronize zone data on the main primary DNS name server for the particular zone with zone data on the backup primary DNS name server for the particular zone.

8. The main primary DNS name server of claim 7 wherein each of the main last-known-synchronization serial number, the main current serial number, the backup last-known-synchronization serial number, and the backup current serial number is a 64-bit binary number having an upper 32-bit portion identifying a generation value and a lower 32-bit portion identifying a sequence value for the particular zone.

9. The main primary DNS name server of claim 7 wherein the DNS information includes main zone data for the particular zone and backup zone data for the particular zone; wherein the main zone data is local to the main primary DNS name server; wherein the backup zone data is local to the backup primary DNS name server; and wherein the controller, when synchronizing the DNS information based on zone data serial numbers, is configured to:

when the main last-known-synchronization serial number for the particular zone matches the backup last-known-synchronization serial number for the particular zone, the main current serial number for the particular zone, and the backup current serial number for the particular zone, leave the main zone data and the backup zone data without performing any merging on the particular zone; or otherwise, merge the main zone data and the backup zone data.

10. The main primary DNS name server of claim 7 wherein while the main primary DNS name server is maintained in a normal operating state, the backup primary DNS name server is configured to refrain from modifying the backup DNS records based on DNS updates sent from the DNS clients to the backup primary DNS name server.

11. A method for updating Domain Name System (DNS) information in a main primary DNS name server, comprising the following computer-implemented steps:

receiving a DNS update sent from a DNS client to the main primary DNS name server;

directly modifying a main DNS record based on the DNS update;

directing a backup primary DNS name server to modify a backup DNS record based on the DNS update while both the main primary DNS name server and the backup primary DNS name server (i) are configured to distribute DNS information to secondary DNS name servers and DNS clients and (ii) are in ongoing communication with each other, the backup primary DNS name server being configured to receive DNS updates sent from the DNS clients to the backup primary DNS name server and modify backup DNS records based on the DNS updates in response to a loss of communication between the main primary DNS name server and the backup primary DNS name server;

communicating with the backup primary DNS name server to maintain the main primary DNS name server in a normal operating state in which the main primary DNS name server waits to receive confirmation that the backup DNS record has been modified by the backup primary DNS name server prior to acknowledging completion of the DNS update to the DNS client;

in response to a loss of communications between the main primary DNS name server and the backup primary DNS name server, transitioning the main primary DNS name server from the normal operating state to a communications interrupted state in which the main primary DNS name server acknowledges subsequent DNS updates sent from the DNS clients to the main primary DNS name server without waiting for confirmation from the backup primary DNS name server;

in response to reestablishment of communications between the main primary DNS name server and the backup primary DNS name server, transitioning the main primary DNS name server from the communications interrupted state to a synchronization state in which the main primary DNS name server and the backup primary DNS name server synchronize the DNS information; and while the main primary DNS name server is in the synchronization state, synchronizing the DNS information based on zone data serial numbers;

wherein synchronizing the DNS information based on zone data serial numbers includes:

in a zone synchronization phase, identifying a common set of authoritative primary zones which were modified while the main primary DNS name server was in the communications interrupted state.

12. The method of claim 11 wherein while the main primary DNS name server is maintained in a normal operating state, the backup primary DNS name server is configured to refrain from modifying the backup DNS records based on DNS updates sent from the DNS clients to the backup primary DNS name server.

13. A backup primary Domain Name System (DNS) name server, comprising:
a network interface;
memory; and
a controller coupled to the network interface and the memory, the controller being configured to:
receive direction to modify a backup DNS record from a main primary DNS name server;
directly modify the backup DNS record based on the direction;
provide confirmation that the backup DNS record was modified to the main primary DNS name server while both the main primary DNS name server and the backup primary DNS name server (i) are configured to distribute DNS information to secondary DNS name servers and DNS clients and (ii) are in ongoing communication with each other, the backup primary DNS name server being configured to receive DNS updates sent from the DNS clients to the backup primary DNS name server and modify backup DNS records based on the DNS updates in response to a loss of communication between the main primary DNS name server and the backup primary DNS name server; and
communicate with the main primary DNS name server to maintain the backup primary DNS name server in a normal operating state in which the backup primary DNS name server refrains from modifying the backup DNS records based on DNS updates sent from the DNS clients to the backup primary DNS name server.

14. The backup primary DNS name server of claim 13 wherein: the controller is further configured to:
communicate with the main primary DNS name server to maintain the main primary DNS name server in a normal operating state in which the main primary DNS name server waits to receive confirmation that the backup DNS record has been modified by the backup primary DNS name server prior to acknowledging completion of the DNS update to the DNS client;
in response to a loss of communications between the main primary DNS name server and the backup primary DNS name server, transition the backup primary DNS name server from the normal operating state to a communications interrupted state in which the backup primary DNS name server acknowledges subsequent DNS updates sent from the DNS clients to the backup primary DNS name server without waiting for confirmation from the main primary DNS name server;
in response to reestablishment of communications between the main primary DNS name server and the backup primary DNS name server, transition the backup primary DNS name server from the communications interrupted state to a synchronization state in which the main primary DNS name server and the backup primary DNS name server synchronize the DNS information; and
while the backup primary DNS name server is in the synchronization state, synchronize the DNS information based on zone data serial numbers; and wherein the controller, when synchronizing the DNS information based on zone data serial numbers, is configured to:
in a zone synchronization phase, identify a common set of authoritative primary zones which were modified while the backup primary DNS name server was in the communications interrupted state.

15. The backup primary DNS name server of claim 13 wherein: the controller is further configured to:
communicate with the main primary DNS name server to maintain the main primary DNS name server in a normal operating state in which the main primary DNS name server waits to receive confirmation that the backup DNS record has been modified by the backup primary DNS name server prior to acknowledging completion of the DNS update to the DNS client;
in response to a loss of communications between the main primary DNS name server and the backup primary DNS name server, transition the backup primary DNS name server from the normal operating state to a communications interrupted state in which the backup primary DNS name server acknowledges subsequent DNS updates sent from the DNS clients to the backup primary DNS name server without waiting for confirmation from the main primary DNS name server;
in response to reestablishment of communications between the main primary DNS name server and the backup primary DNS name server, transition the backup primary DNS name server from the communications interrupted state to a synchronization state in which the main primary DNS name server and the backup primary DNS name server synchronize the DNS information; and
while the backup primary DNS name server is in the synchronization state, synchronize the DNS information based on zone data serial numbers; the backup primary DNS name server has a backup last-known-synchronization serial number and a backup current serial number for a particular zone;
the main primary DNS name server has a main last-known-synchronization serial number and a main current serial number for the particular zone; and
the controller, when synchronizing the DNS information based on zone data serial numbers, is configured to compare: (i) the main last-known-synchronization serial number for the particular zone to the backup last-known-synchronization serial number for the particular zone, (ii) the main current serial number for the particular zone to the main last-known-synchronization serial number for the particular zone, and (iii) the backup current serial number for the particular zone to the backup last-known-synchronization serial number for the particular zone to determine whether to synchronize zone data on the backup primary DNS name server for the particular zone with zone data on the main primary DNS name server for the particular zone.

16. The backup primary DNS name server of claim 15 wherein each of the main last-known-synchronization serial number, the main current serial number, the backup last-known-synchronization serial number, and the backup current serial number is a 64-bit binary number having an upper 32-bit portion identifying a generation value and a lower 32-bit portion identifying a sequence value for the particular zone.

17. The backup primary DNS name server of claim 15 wherein the DNS information includes main zone data for the particular zone and backup zone data for the particular zone;

wherein the main zone data is local to the main primary DNS name server; wherein the backup zone data is local to the backup primary DNS name server; and wherein the controller, when synchronizing the DNS information based on zone data serial numbers, is configured to:

when the backup last-known-synchronization serial number for the particular zone matches the main last-known-synchronization serial number for the particular zone, the main current serial number for the particular zone, and the backup current serial number for the particular zone, leave the main zone data and the backup zone data without performing any merging on the particular zone; or otherwise, merge the main zone data and the backup zone data.

18. A backup primary Domain Name System (DNS) name server, comprising:

a network interface;

memory; and control means coupled to the network interface and the memory, the control means including:

means for receiving direction to modify a backup DNS record from a main primary DNS name server;

means for directly modifying the backup DNS record based on the direction; and means for providing confirmation that the backup DNS record was modified to the main primary DNS name server while both the main primary DNS name server and the backup primary DNS name server (i) are configured to distribute DNS information to secondary DNS name servers and DNS clients and (ii) are in ongoing communication with each other, the backup primary DNS name server being configured to receive DNS updates sent from the DNS clients to the backup primary DNS name server and modify backup DNS records based on the DNS updates in response to a loss of communication between the main primary DNS name server and the backup primary DNS name server;

means for communicating with the main primary DNS name server to maintain the backup primary DNS name server in a normal operating state in which the backup primary DNS name server refrains from modifying the backup DNS records based on DNS updates sent from the DNS clients to the backup primary DNS name server.

* * * * *